No. 748,818. PATENTED JAN. 5, 1904.
T. TRELOAR.
VEHICLE BRAKE.
APPLICATION FILED SEPT. 21, 1903.
NO MODEL.
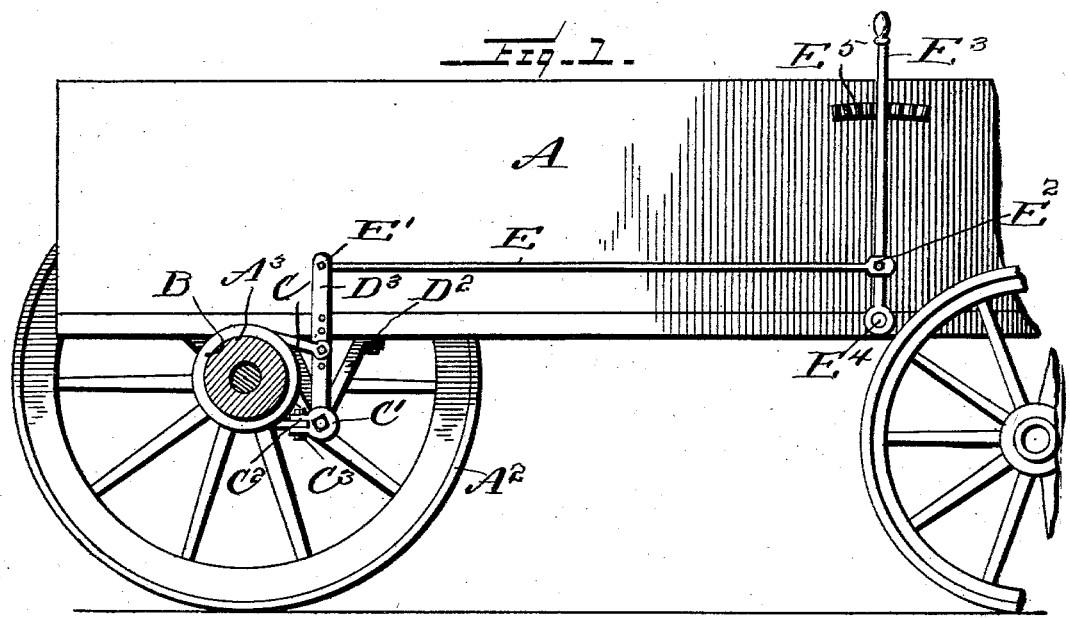
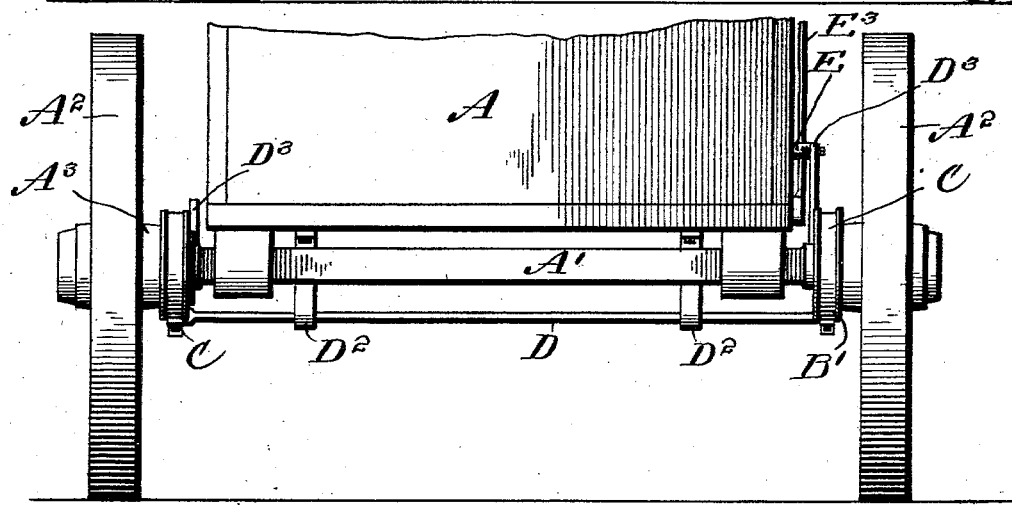
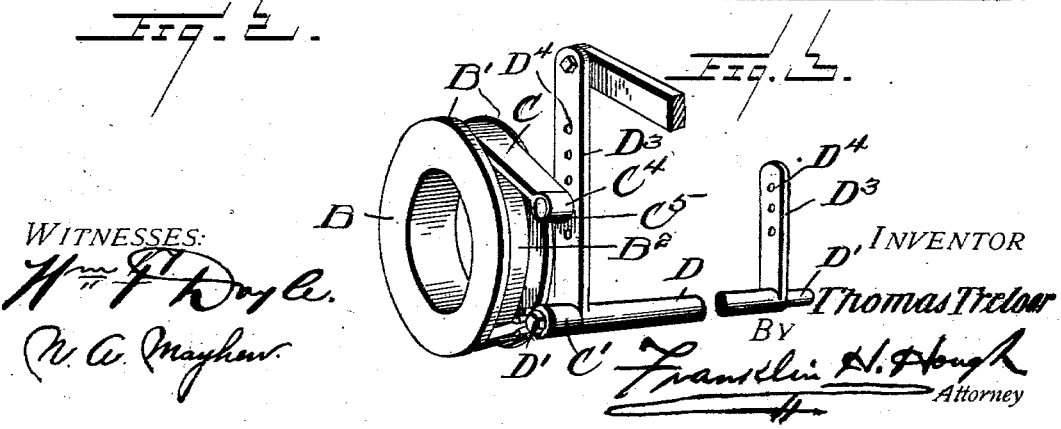

No. 748,818. Patented January 5, 1904.

UNITED STATES PATENT OFFICE.

THOMAS TRELOAR, OF RADERSBURG, MONTANA.

VEHICLE-BRAKE.

SPECIFICATION forming part of Letters Patent No. 748,818, dated January 5, 1904.

Application filed September 21, 1903. Serial No. 174,082. (No model.)

*To all whom it may concern:*

Be it known that I, THOMAS TRELOAR, a citizen of the United States, residing at Radersburg, in the county of Broadwater and State of Montana, have invented certain new and useful Improvements in Vehicle-Brakes; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to a wagon-brake, and particularly to a band-brake adapted for application to the wheels at opposite sides of a wagon.

The invention has for an object to provide a novel improved construction for supporting such a brake and simultaneously operating the brakes upon each of the wheels, so as to secure the most effective braking action of a loaded wagon, particularly when the same is upon a steep grade.

Other and further objects and advantages of the invention will be hereinafter set forth and the novel features thereof defined in the appended claim.

In the drawings, Figure 1 is an elevation of a wagon with the hub of one wheel in section. Fig. 2 is a rear view of a wagon with the invention applied thereto, and Fig. 3 is a detail perspective of the brake mechanism removed from the wagon with parts broken away.

Like letters of reference refer to like parts in the several figures of the drawings.

Letter A designates a wagon-body, which may be of any desired construction and provided with axles A', carrying the usual construction of wheels $A^2$ upon opposite ends of the axle to which the brake is applied. In the present illustration the brake is shown as applied to the opposite rear wheels and is adapted to be located upon the hubs $A^3$ thereof next the body of the vehicle.

The brake mechanism comprises a drum B, provided with parallel flanges B', between which a contact-face $B^2$ is provided. Coöperating with this face is a strap or band C, one end of which is mounted upon a relatively fixed bearing by means of a sleeve C', adapted to rotatably fit the extended end D' of a brake-rod D, extending transversely beneath the vehicle-body and supported in bearing-brackets $D^2$ of any desired construction secured to the end face of the body. The sleeve C' is provided with a clip $C^2$, within which the fixed end of the band C may be secured by means of a bolt $C^3$, while the opposite end of the band is provided with an eye $C^4$, secured to the vertical arm $D^3$ of the brake-rod by means of a pin $C^5$, which is adjustable upon said arm by means of apertures $D^4$, so as to vary the area of frictional contact between the drum and the band. It will be observed that the arms $D^3$ are integral with and connected to the brake-rod, so as to rotate in unison therewith and simultaneously apply the brake at the opposite sides of the vehicle.

For the purpose of applying the brake any desired form of lever and connections may be used. For instance, a rod E may be pivotally connected to the upper end of one arm $D^3$, as at E', and at its opposite end $E^2$, pivoted to a vertically-disposed lever $E^3$, which is pivoted at its lower portion $E^4$ and adapted to engage holding-teeth $E^5$, suitably secured to a vehicle.

The operation of the invention will be apparent from the foregoing description, and it will be seen that the brake is adapted for application to wagons ready for use by simply securing the drum to the hub of the wheels and applying the brake-rod beneath the body of the vehicle, while the construction of this rod provides at its opposite ends a mounting for the fixed end of the brake-strap, while the vertical arms from the rod actuate the strap to apply the brake upon the drums at opposite sides of the vehicle. It will also be noted that the construction of strap permits the same to be readily removed and replaced in the event of wear, and the simplicity of construction permits the most economical manufacture of brake. The construction of the brake-rod provides a very strong and efficient construction which by being disposed parallel to the axle and slightly below the same applies a frictional grip of the strap in the most effective manner to secure a holding of a loaded wagon under all conditions of use It will be obvious that changes may be made in the details of construction and configuration without departing from the spirit of the invention and defined by the appended claim.

Having thus fully described my invention, what I claim as new, and desire to secure by Letters Patent, is—

A brake mechanism for wagons comprising in combination with a wagon-box and rear axle thereon, wheels upon said axle, flanged drums secured to the hubs of said wheels, a rod D mounted in suitable bearings underneath the body of the wagon, a recessed clip $C^2$ fitted upon an extension of said rod, a strap fitted in said recessed clip and passing about the grooved circumference of said drum, an integral arm $D^3$ projecting at right angles from said rod and having apertures therein, a pin carried in one of said apertures and engaging an eye formed at the end of said strap, an operating-lever pivoted to the wagon-box, and a rod connecting said lever and arm, as set forth.

In testimony whereof I hereunto affix my signature in presence of two witnesses.

THOMAS TRELOAR.

Witnesses:
C. E. WORDEN,
J. C. BLACKER.